(Model.)
W. H. KNAPP.
REEL RAKE.
No. 299,989. Patented June 10, 1884.
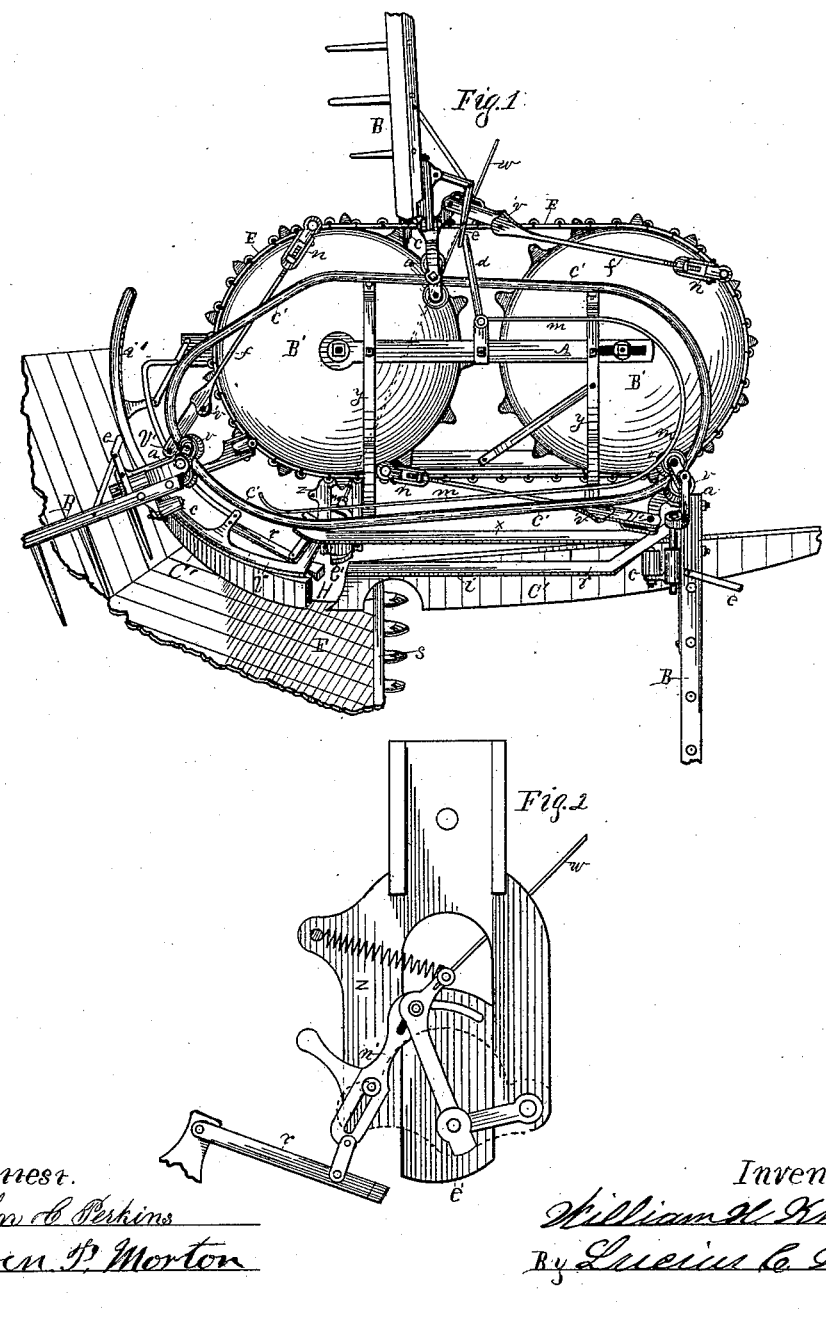

(Model.)

2 Sheets—Sheet 2.

W. H. KNAPP.
REEL RAKE.

No. 299,989. Patented June 10, 1884.

Attest.
John C Perkins
Owen P Morton

Inventor.
William H. Knapp
By Lucius C. West
Atty

UNITED STATES PATENT OFFICE.

WILLIAM H. KNAPP, OF GALESBURG, MICHIGAN.

REEL-RAKE.

SPECIFICATION forming part of Letters Patent No. 299,989, dated June 10, 1884.

Application filed June 17, 1882. (Model.)

*To all whom it may concern:*

Be it known that I, WILLIAM H. KNAPP, a citizen of the United States, residing at Galesburg, county of Kalamazoo, State of Michigan, have invented new and useful Improvements in Reel-Rakes, of which the following is a specification.

My invention has for its object certain improvements in a device patented to me in the United States July 5, 1881, No. 243,711. The object attained in my former device was to throw the rakes into the grain in advance of the cutter-bar parallel therewith, and to carry them to and past said cutter-bar in said parallel position, thus reeling all the grain squarely instead of obliquely against the sickle. The mechanism used for attaining the above object consisted in two horizontally-located sprocket-wheels bearing a chain or band, to which were connected rakes, and a rake track and guide, consisting of two parallel bars extending around said band-wheels, said rakes being provided with draw-bars connecting them with the chain, which were adapted to shorten and lengthen automatically by one portion sliding into another. The same result, in regard to the movement of the rakes and their action upon the grain in reeling and raking it, is effected by my present construction; but I have found that by locating the band-wheels at an angle with a horizontal plane, and using a rake-guide located above said wheels, and coupling therewith the rakes by a device hereinafter described, I greatly simplify and cheapen the construction, and the rakes are carried with a steadier and more positive movement, especially in ascending and descending the inclines during their transit around the band-wheels. In my former device the rakes were jerked too suddenly up the incline, after leaving the gavel, and were whipped down into the grain forward of the sickle with such force as to endanger the mechanism, and also making it very difficult to regulate their movements in regard to time and the state of the grain. In my present device these objections are overcome and other useful results attained, which will appear in the detailed description.

Figure 3:
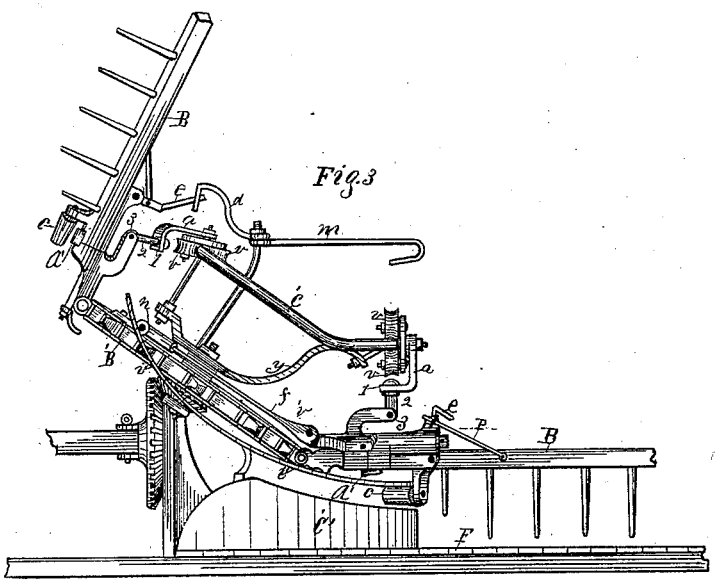
Figure 4:
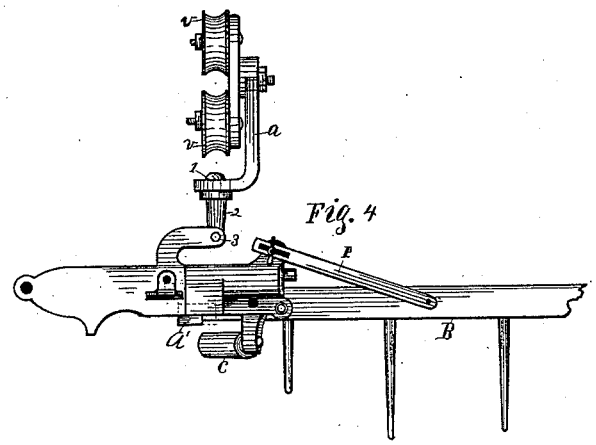

In the accompanying drawings, forming a part of this specification, Figure 1 is a perspective view, looking from a point above the outer end of the finger-bar; Fig. 2, a detached view of the tripping mechanism, hereinafter described; Fig. 3, an end view, looking from the rear of the machine; and Fig. 4, a rake and connections, enlarged, the same being shown at the right hand of Fig. 3.

B' B' are the chain or band wheels formerly used, except that they are here placed at an angle (see Fig. 3) with a horizontal plane; or, if deemed more practicable, they may be placed perpendicularly.

E is the chain or band with which the inner ends of the rakes B B are connected.

The rake-guide $c'$, in lieu of the former double track or way, is made of a round bar of metal, and is located above the band-wheels B' B'. It will be observed that by arranging these wheels at an angle with a horizontal plane the inner ends of the rakes are carried up and down at a speed more nearly uniform with the outer ends, thus keeping said rakes at these points in their transit more nearly horizontal, which obviates their whipping down into the grain with undue force. The rakes are guided and supported in their transit around the band-wheel by means of a rake-support connecting with the rake and with the rake-guide. Said rake-support consists of parts $a$ and 2, swiveled together at 1, and jointedly connecting with the rake-head at 3. The other end is provided with friction-wheels $v\ v$, which span and play upon opposite sides of the rake-guide $c'$. The wheels are in effect swiveled to said rod, as will be observed by noting the different positions taken by them during the operation.

The draw-bar and brace used in my former device were found objectionable, owing to the parts which slid together sometimes catching. In my present draw-bar and brace $f$, I dispense with one joint and the recessed portion in which a headed bar of the other portion played, and provide it with a knuckle-joint, $v'$, similar to the joint in a carriage-top brace.

The rake is swiveled to the head proper, and provided with a spring-actuated lock, $a'$, as in my former rake.

$c$ is a friction-roller, the use of which is explained in the following description of the operation in connection with a further description of the construction.

In my present device it is designed that the gavel may be raked directly back of the finger-bar $s$ upon the table F, for binding thereon, and at any distance from said finger-bar desired, which is controlled by the distance at which wheels B′ B′ are apart and the position in relation to other parts which they occupy, or to sweep the gavel around back of the machine onto the ground, as in side-delivery machines.

Referring to Fig. 1, supposing the reaper to be in motion, the rake forward of the finger-bar $s$ moves back, roller $c$ catching under bar $i$ until depression or gap H is reached, when, by pulling on rod $w$, the cam-plate $e$ and the gate or bridge $r$ may be drawn back, allowing the roller $c$ to run under bar $i'$, which prevents the rake from rising, and causes it to rake the gavel back on the table or around onto the ground; but if the plate $e'$ and gate $r$ were not drawn back, the spring-lock $a'$ would engage said plate $e'$, unlocking the rake, and allowing it to trip when roller $c$ comes in contact with the gate $r$, which stops the space between the bar $i'$ and the wall C′. The gate $r$ has a yielding capacity, as shown by the construction in Fig. 2, in order that it may yield and allow the roller $c$ to pass under the bar $i'$, if the rake B should not be unlocked for any cause, thus preventing breakage, which might otherwise occur. This gate $r$ is pivotally connected at one end with a support, and is pivotally connected with the trip-plate $e'$ by a bar, $n'$. This bar is slotted, and connected with the other parts, as shown in Fig. 2, in such a manner that said gate will yield independently of the trip-plate, if necessary, and both gate and trip-plate may be drawn back together by rod $w$. As the rake is carried on around the wheels B′ B′, it rises to a higher plane, and is canted more nearly vertical, and then arm $c$ comes in contact with the stop $d$, turning the rake so as to be locked by the lock $a'$ springing into its recess in the rake-head, ready to again strike into the grain, teeth downward, forward of the finger-bar.

For a more thorough understanding of my reel-rake, reference should be had to the patent above referred to.

Having thus described my invention, what I claim is—

1. The combination, with the band-wheels, a rake-band and rake, and a cam guide-rod, located and adapted as set forth, of a rake-support consisting of the friction-rollers and a bar composed of two parts swiveled together, one end of said swiveled bar being jointedly connected with the rake-head, and the other end supporting the friction-rollers, the latter adapted to play upon opposite and different sides of the guide-rod during the transit of the rake around the band-wheels, all substantially as specified and shown.

2. The device for both unlocking and turning the rake, consisting of the trip-plate in combination with the yielding gate connected therewith, both of said parts constructed and adapted to operate substantially as set forth.

3. In a reel-rake, the combination, with band-wheels located at an angle to a horizontal plane, and a cam guide-rod located substantially in the position to said band-wheels shown, of a rake-band, rakes, rake draw-bars, and rake-supports adapted to engage and play upon said guide-rod during the transit of the rakes, all substantially as specified.

WILLIAM H. KNAPP.

Witnesses:
RICHARD A. SYKES,
FRANK C. GIBBS.